(12) United States Patent
Morena et al.

(10) Patent No.: US 6,770,111 B2
(45) Date of Patent: Aug. 3, 2004

(54) POLLUCITE-BASED CERAMIC WITH LOW CTE

(75) Inventors: Robert Morena, Caton, NY (US); Dell J. St. Julien, Watkins Glen, NY (US); Bryan R. Wheaton, Cameron Mills, NY (US); John F. Wight, Jr., Corning, NY (US)

(73) Assignee: Corning Incorporated, Corning, NY (US)

( * ) Notice: Subject to any disclaimer, the term of this patent is extended or adjusted under 35 U.S.C. 154(b) by 52 days.

(21) Appl. No.: 10/045,256

(22) Filed: Oct. 25, 2001

(65) Prior Publication Data

US 2002/0098967 A1 Jul. 25, 2002

Related U.S. Application Data

(60) Provisional application No. 60/246,661, filed on Nov. 7, 2000.

(51) Int. Cl.⁷ .......................... B01D 39/20; C04B 35/18
(52) U.S. Cl. ..................... 55/523; 55/DIG. 30; 501/6; 501/7; 501/8; 501/39; 65/33.7; 65/33.8; 264/44; 264/628; 264/630; 264/634; 264/DIG. 48
(58) Field of Search ............................ 55/523; 501/6, 501/7, 8, 39; 65/17.3, 33.7, 33.8; 264/44, 628, 630, 634, 177.12, DIG. 48

(56) References Cited

U.S. PATENT DOCUMENTS

| | | | |
|---|---|---|---|
| 3,637,406 A | * | 1/1972 | Bailey .......................... 264/658 |
| 3,723,140 A | | 3/1973 | Beall et al. |
| 3,833,385 A | | 9/1974 | Adelsberg et al. |
| 4,329,162 A | | 5/1982 | Pitcher, Jr. |
| 5,071,801 A | | 12/1991 | Bedard et al. |
| 5,094,677 A | * | 3/1992 | Morena .......................... 501/6 |
| 5,192,722 A | | 3/1993 | Bedard et al. |
| 5,204,077 A | * | 4/1993 | Mori et al. ............... 423/328.2 |
| 5,209,885 A | * | 5/1993 | Quadir et al. ................ 264/639 |
| 5,296,423 A | * | 3/1994 | Locker ......................... 264/630 |
| 5,549,725 A | * | 8/1996 | Kasai et al. ................... 55/523 |
| 5,766,393 A | * | 6/1998 | Nishimura et al. ......... 264/630 |
| 5,875,407 A | | 2/1999 | Pereira |
| 5,925,308 A | | 7/1999 | Fewkes et al. |
| 6,322,605 B1 | | 11/2001 | He et al. |

OTHER PUBLICATIONS

Yanagisawa et al., "Immobilization of Cesium into Pollucite Structure by Hydrothermal Hot–Pressing", Journal of Nuclear Science & Technology, 24(1), pp. 51–60, 1/87.

Gallagher et al., "Preparation of X–ray Characterization of Pollucite (CsA1Si2O6)". J. Inorg. and Chem. vol. 43, p. 1773–1777, 1981.

Barrer et al., "Hydrothermal Chemistry of Silicates, Part IV Rubidium and Cesium Aluminosilicate", part III, 1953, p. 4029–4035.

Taylor et al., "The Thermal Expansion of the Leucite Group of Minerals", The American Mineralogist, vol. 53, Sep.–Oct. 1968, p. 1476–1489.

Richerson et al., "Synthesis and Thermal Expansion of Polycrystalline Cesium Minerals", Jour. of the American Ceramic Society, vol. 55, No. 5, p. 269–273.

* cited by examiner

*Primary Examiner*—Duane Smith
*Assistant Examiner*—Jason M. Greene
(74) *Attorney, Agent, or Firm*—Anca C. Gheorghiu (57) ABSTRACT

A ceramic structure which is pollucite-based and has high refractoriness and high resistance to thermal shock. The inventive structure is suitable in high temperature applications such as a filtering particulates from diesel engine exhaust.

26 Claims, 4 Drawing Sheets

POLLUCITE-BASED CERAMIC WITH LOW CTE

This application claims the benefit of U.S. Provisional Application No. 60/246,661, filed Nov. 7, 2000, entitled "Pollucite-Based Ceramic with Low CTE", by Morena et al.

BACKGROUND OF THE INVENTION

This invention relates to a pollucite-based, highly refractory ceramic having high resistance to thermal shock and being suitable for high temperature applications such as filters for filtering particulates from diesel engines exhaust streams.

Pollucite which has the composition $Cs_2O.Al_2O_3.4SiO_2$ or $CAS_4$ is the most refractory silicate known exhibiting a melting point above 1900° C. However, a drawback associated with this material is its high coefficient of thermal expansion at temperatures up to 400° C., which is usually about $120 \times 10^{-7}/°C$., rendering the material a low resistance to thermal shock. Therefore, despite its high refractoriness, pollucite would not be suitable for filtering applications of gas engines exhausts such as diesel particulate filters.

It would be considered an advancement in the art to obtain a material which has the high refractoriness of pollucite and also high resistance to thermal shock.

The present invention provides such a pollucite-based material and a method of fabricating the same.

SUMMARY OF THE INVENTION

In accordance with one aspect of the invention, there is provided pollucite-based ceramic structures having high refractoriness and a high resistance to thermal shock, properties which make the inventive structure extremely desirable in filtering applications of exhaust streams, in particular as filters for diesel exhaust engines.

In an embodiment the inventive ceramic structures comprises a first phase having a stoichiometry of $Cs_2O.Al_2O_3.4SiO_2$ ($CAS_4$) and a second phase having a stoichiometry $Cs_2O.Al_2O_3.2SiO_2$ ($CAS_2$).

In another embodiment the inventive ceramic structures further include a third phase selected from the group consisting of $SrO.Al_2O_3.2SiO_2$ ($SAS_2$), $SrO.SiO_2$ ($SrSiO_3$) and combinations thereof.

The inventive structures have high thermal expansion anisotropy of between 1400–1450 ppm, as calculated from dimensional change $\Delta L/L_0$ over a temperature range from room temperature to 1000° C. and an average coefficient of thermal expansion from room temperature to 1000° C. of about $-10 \times 10^{-7}/°C$. to $+25 \times 10^{-7}/°C$., preferably $-5 \times 10^{-7}/°C$. to $15 \times 10^{-7}/°C$. For the two phase embodiment a $CAS_4$–$CAS_2$ I-ratio, defined as the ratio the intensity of the major peak of the $CAS_4$ phase at approximately 3.42 Å to the intensity of the major peak of the $CAS_2$ at 3.24 Å is about 0.25 to 3.0, preferably about 0.5 to 2, and most preferably about 1.0.

An advantage of the inventive structure is its suitability in high temperature applications such as filtering particulates from diesel engine exhaust. In particular the inventive structure is especially suitable as a honeycomb diesel particular filter having an inlet end and an outlet end and a multiplicity of cells extending from the inlet end to the outlet end, the cells having porous walls, wherein part of the total number of cells at the inlet end are plugged along a portion of their lengths, and the remaining part of cells that are open at the inlet end are plugged at the outlet end along a portion of their lengths, so that an engine exhaust stream passing through the cells of the honeycomb from the inlet end to the outlet end flows into the open cells, through the cell walls, and out of the structure through the open cells at the outlet end. Diesel particulate filters having the inventive structure have been obtained.

In accordance with another aspect of the invention, there is provided a method of producing a formable mixture that involves combining a dry blend material consisting essentially of 70–90%, by weight, of a glass frit and 10–30%, by weight, $Al_2O_3$, a solvent selected from the group consisting of deionized water, an emulsion consists essentially of, about 95%, by weight, deionized water, about 0.7%, by weight, triethanolamine and about 4.3%, by weight, oleic acid, and combinations thereof, and a polymer selected from the group consisting of a crosslinked polyacrylic acid copolymer, a polyethylene oxide polymer, and combinations thereof.

Up to 30%, by weight, SrO may be substituted for $Cs_2O$, the resulting ceramic structure then including a third phase selected from the group consisting of $SrO.Al_2O_3.2SiO_2$ ($SAS_2$), $SrO.SiO_2$ ($SrSiO_3$) and combinations thereof. In forming the mixture containing the glass frit having SrO substituted for cesium, a suitable polymer is an aqueous-based cellulose ether polymer selected from the group consisting of methylcellulose or hydroxylpropyl methylcellulose. Unlike the $Cs_2O$ glass frit, the $Cs_2O$—SrO glass frit has increased aqueous stability because strontium prevents the cesium from leaching and reacting with water to form a gel or cementitious mixture which is incapable of being shaped.

In accordance with another aspect of the invention, the formable mixture is shaped by extrusion to form a green monolithic structure, such as a honeycomb, which is then fired in an electric furnace at a temperature of about 1350 to 1550° C. over a period of about 6 to 12 hours, and held at a maximum temperature for about 4 to 12 hours to form the final product structure.

DETAILED DESCRIPTION OF THE INVENTION

The invention relates to pollucite-based ceramic structures which have high refractoriness and high resistance to thermal shock.

In one embodiment, the inventive ceramic structures comprise a pollucite phase, $Cs_2O.Al_2O_3.4SiO_2$ or $CAS_4$ and a cesium aluminum di-silicate phase, $Cs_2O.Al_2O_3.2SiO_2$ or $CAS_2$.

In another embodiment the inventive ceramic structures further include another phase selected from the group consisting of $SrO.Al_2O_3.2SiO_2$ ($SAS_2$), $SrO.SiO_2$ ($SrSiO_3$) and combinations thereof.

The inventive structures are highly refractory with a melting point in excess of 1800° C., and highly resistant to thermal shock with an average coefficient of thermal expansion from room temperature to 1000° C. of $-10\times10^{-7}/°$ C. to $+25\times10^{-7}/°$ C., preferably $-5\times10^{-7}/°$ C. to $15\times10^{-7}/°$ C., due to a high thermal expansion anisotropy (i.e., widely differing expansions among different crystallographic axes). The aforementioned advantageous properties make the inventive structures extremely suitable for use in harsh environments and high temperature applications.

Specifically, the inventive structure are suitable in filtration applications for the removal of particulate material (i.e., carbon soot) from diesel engine exhaust streams, such as diesel particulate filters, in which regeneration of the filter by burning of the carbon soot can result in locally high temperatures within the filter.

While the filter can have any shape or geometry suitable for a particular application, it is preferred that it be multicellular structure such as a honeycomb structure. Honeycombs are multicellular bodies having an inlet and outlet end or face, and a multiplicity of cells extending from inlet end to outlet end, the cells having porous walls.

Generally honeycomb cell densities range from about 4 cells/cm$^2$ (25 cells/in$^2$) to about 93 cells/cm$^2$ (600 cells/in$^2$). Examples of honeycombs produced by the process of the present invention, although it is to be understood that the invention is not limited to such, are those having about 16 cells/cm$^2$ (100 cells/in$^2$) to about 31 cells/cm$^2$ (200 cells/in$^2$), with a wall thickness of about 0.3 to 0.4 mm (10 to 15 mils). Typically wall thicknesses are from about 0.07 to about 0.8 mm (about 3 to 30 mils).

It is preferred to have part of the total number of cells plugged to allow better flow through the porous walls. A portion of the cells at the inlet end or face are plugged with a paste having same or similar composition to that of the green body, as described in U.S. Pat. No. 4,329,162 which is herein incorporated by reference. The plugging is only at the ends of the cells which is typically to a depth of about 5 to 20 mm, although this can vary. A portion of the cells on the outlet end but not corresponding to those on the inlet end are plugged. Therefore, each cell is plugged only at one end. The preferred arrangement is to have every other cell on a given face plugged as in a checkered pattern.

This plugging configuration allows for more intimate contact between the exhaust stream and the porous wall of the substrate. The exhaust stream flows into the substrate through the open cells at the inlet end, then through the porous cell walls, and out of the structure through the open cells at the outlet end. Filters of the type herein described are known as a "wall flow" filters since the flow paths resulting from alternate channel plugging require the exhaust being treated to flow through the porous ceramic cell walls prior to exiting the filter.

The invention also relates to a method for fabricating the inventive structures by forming a mixture comprising a dry blend, a solvent, a polymer and optionally a pore former. The mixture may further be shaped into a green body, such as by extrusion into honeycomb structures, and then fired to form the final product structure.

The dry blend comprises a precursor glass frit and alumina. The precursor glass frit is prepared by melting $SiO_2$-, $Cs_2O$-, and $SrO_2$-containing materials at temperatures no higher than 1650° C. to obtain a glass frit having a $SiO_2/Cs_2O$ or $SiO_2/(Cs_2O+SrO)$ molar ratio of between 2.0–4.0, preferably 2.0–3.0 and most preferably 2.5.

Cesium-silicate glasses with cesium oxide greater than about 50 weight percent (wt. %) on an oxide basis tend to be hygroscopic at ambient temperatures. To alleviate this condition a minor amount of alumina ($Al_2O_3$) of about 3–5 wt. % on an oxide basis may be added to significantly improve the moisture stability. Greater levels than 5 wt. % may increase the viscosity of the glass frit.

For the two-phase embodiment the composition of the precursor glass frit consists essentially, expressed in weight percent on an oxide basis, of 60–68% $Cs_2O$, 29–35% $SiO_2$, and optionally 3–5% $Al_2O_3$, the latter being added to improve the moisture stability of the glass. The preferred composition consists essentially, expressed in weight percent on an oxide basis, of 62% $Cs_2O$, 33% $SiO_2$, and optionally 5% $Al_2O_3$.

For the three-phase embodiment up to 30%, by weight, SrO is substituted for $Cs_2O$, to obtain a third phase selected from the group consisting of $SrO.Al_2O_3.2SiO_2$ ($SAS_2$), $SrO.SiO_2$ ($SrSiO_3$) and combinations thereof. It has been found that SrO substitution for $Cs_2O$ dramatically improves the aqueous stability of the glass frit in the presence of an aqueous polymer, even in the absence of alumina. This is because strontium prevents the cesium in the glass frit from leaching and reacting with water. This reaction may hinder the formability of the mixture, by producing a gel or cementitious consistency in the mixture.

In a preferred embodiment the composition of the dry blend consists essentially, expressed in percent by weight based on the total weight of powder materials, of about 70–90% glass frit and 10–30% alumina, most preferably 85% glass frit and 15% alumina.

The solvent is selected from the group consisting of deionized water, an emulsion consisting essentially of about 95% deionized water, about 0.7% triethanolamine (such as TEA 99 manufactured by DOW Chemical Co. Midland, Mich.) and about 4.3% oleic acid, by weight based on 100 grams of emulsion, and combinations thereof. Isopropanol may also be suitable.

The polymer needs to be tolerant of the alkaline environment created by the glass frit and not be detrimentally affected by leachates from the glass frit. The polymer aids in the mixing, prevents water migration, creates a plastic yield stress in the batch, and improves green strength.

A suitable polymer is selected from the group consisting of a crosslinked polyacrylic acid copolymer, such as Carbopol 2020 (manufactured by B F Goodrich, Cleveland Ohio), a polyethylene oxide polymer, such as Polyox WSR Coagulant (manufactured by Union Carbide, Danburry Conn.), and combinations thereof. Preferably, the crosslinked polyacrylic acid copolymer is preferred for the mixture containing the $Cs_2O$ glass frit.

Another suitable polymer is an aqueous-based cellulose ether polymer, preferably selected from the group consisting of methylcellulose and hydroxylpropyl methylcellulose. The aqueous-based cellulose ether polymer is preferred for the mixture containing the $Cs_2O$—SrO glass frit, because as described herein above the strontium dramatically improves the aqueous stability of the glass frit in the presence of water.

The mixture may also contain a pore former, as an optional ingredient. A pore former is a fugitive particulate material which evaporates or undergoes pyrolysis during drying or heating of the green body to obtain a desired, usually larger porosity and/or coarser median pore diameter than would be obtained otherwise. When a pore former is used, it is advantageous that it be a particulate pore former. A preferred pore former is graphite in an amount of about 0–25%, having a median particle size of at least 10 micrometers and more preferably of at least 25 micrometers.

Preferably the mixture comprises about 50–85%, by weight, dry blend, about 15–30%, by weight, solvent, about 0.1–8%, by weight, preferably about 0.1–4%, by weight, polymer, and about 0–25%, by weight, graphite.

After blending, the mixture may be shaped into a green body by any suitable means, preferably the mixture is shaped into a honeycomb structure by extrusion. The extrusion operation can be done using a hydraulic ram extrusion press, or a two stage de-airing single auger extruder, or a twin screw mixer with a die assembly attached to the discharge end. In the latter, the proper screw elements are chosen according to material and other process conditions in order to build up sufficient pressure to force the extruded through the die. The extrusion can be vertical or horizontal.

The resulting green honeycomb structure may be optionally dried. To obtain the final product structure the green honeycomb structure is heated to a maximum temperature of about 1350° C. to 1550° C. over a period of about 6 to 12 hours, and held at the maximum temperature for about 4 to 12 hours. The firing may be conducted in an electrically heated furnace.

EXAMPLES

To more fully illustrate the invention, the following non-limiting examples are presented.

Table I below reports compositions for the precursor glasses used to make the glass frits for the dry blends reported in Table II. The composition for each glass is expressed in terms of weight percent on the oxide basis.

For glasses OAM and OAP, a portion of $Cs_2O$ was substituted with $Li_2O$. In the present invention, up to 2 wt. % of $Li_2O$ may be substituted for $Cs_2O$. It has been found that the lithia substitution is beneficial in the inventive bodies in that it reduces macro- or gross-cracking in the final structure, however, it is to be understood that it is optional. Glasses NZC, NZO, and OAM are used to form the two-phase structure comprising a first phase $Cs_2O.Al_2O_3.4SiO_2$ ($CAS_4$) and a second phase $Cs_2O.Al_2O_3.2SiO_2$ ($CAS_2$).

In glass OAT a portion of $Cs_2O$ was substituted with SrO. Glass OAT is used to form the three-phase structure comprising a first phase $Cs_2O.Al_2O_3.4SiO_2$ ($CAS_4$), a second phase $Cs_2O.Al_2O_3.2SiO_2$ ($CAS_2$) and a third phase selected from the group consisting of $SrO.Al_2O_3.2SiO_2$ ($SAS_2$), $SrO.SiO_2$ ($SrSiO_3$) and combinations thereof. In the present invention up to 30 wt. % of SrO may be substituted for $Cs_2O$ in the glass frit.

The precursor glass raw materials were ballmilled together to assist in obtaining a homogeneous melt, charged into platinum crucibles, and inserted into a furnace at 1650° C. After about 12 to 16 hours, the melts, being sufficiently fluid, were poured through water cooled steel rolls to form a thin ribbon of glass which was subsequently dry ballmilled to particles having a mean size of about 5–40 microns. The frit may be calcined for several hours at 600° C. to eliminate any adsorbed water from the surface of the particles.

To form the dry blend the precursor glasses were mixed with powdered α-alumina having a mean particle size of about 0.6 microns, in amounts as reported in Table 1. Comparative example 1 contains calcined clay instead of alumina. In inventive example 3 precursor Glass OAM had a mean particle size of about 5–10 microns, and in inventive example 4 precursor Glass OAM had a mean particle size of about 10–20 microns.

Table II reports the compositions and firing conditions used in the preparation of the inventive structures. All parts, portions, and percentages are based on the total weight of the raw materials, unless otherwise stated. The weight percents of the solvent and polymer are calculated as superadditions with respect to the raw material powder solids by the following formula: [(weight of solvent, polymer or other additive)÷(weight units of powder material)]×100.

Asbury 4740 graphite (manufactured by Asbury Carbons, Inc., Asbury, N.J.) was added as a pore former to some of the examples.

All the dry raw materials were weighed into a container and dry mixed to provide homogenization. The mixtures were then transferred into a stainless steel muller to which the liquid component was gradually added in a quantity sufficient to impart plasticity to the mixture.

The plasticized mixture was then extruded into a cellular structures having about 200 cells per square inch (31 cells/$cm^2$), a wall thickness of about 0.010 to 0.015 inches (0.025 to 0.038 cm), and a diameter of about 2.54 cm (1 in) or about 5.08 cm (2 in).

The cellular samples were optionally dried and then fired in an electrically heated furnace at a rate of about 300–400° C./hr to a maximum temperature of 1350° C. to 1550° C., held for 4–12 hours, and cooled by shutting off power to the furnace.

The samples were then evaluated for phase assemblage as reported in table II. Phase assemblage was identified by powder x-ray diffraction. Comparative example 1 is pure pollucite $CAS_4$ with a major peak at 3.42 Å. It used as a comparative example. Inventive example 2, 3, 4, and 5 comprise the phases $Cs_2O.Al_2O_3.4SiO_2$ ($CAS_4$), and $Cs_2O.Al_2O_3.2SiO_2$ ($CAS_2$). Inventive example 6 includes the phases $Cs_2O.Al_2O_3.4SiO_2$ ($CAS_4$), $Cs_2O.Al_2O_3.2SiO_2$ ($CAS_2$) and $SrO.Al_2O_3.2SiO_2$ ($SAS_2$).

Table II further reports the intensity of the major $CAS_4$ peak at 3.42 Å to the major $CAS_2$ peak at 3.24 Å for the inventive structures comprising phases $Cs_2O.Al_2O_3.4SiO_2$ ($CAS_4$), and $Cs_2O.Al_2O_3.2SiO_2$ ($CAS_2$). This ratio is used herein as the "$CAS_4$–$CAS_2$ I-ratio". Although the percent peak heights are not actually equivalent to the weight percentages or volume percentages of the phases in the fired bodies, they do provide a qualitative comparison of the amounts of these phases among the examples. It has been observed that $CAS_4$–$CAS_2$ I-ratios of about 0.25 to 3.0, preferably about 0.5 to 2, and most preferably 1.0, are beneficial in the inventive two-phase structures. At values lower than 0.25 the two-phase structure tends to be weak, and to fracture spontaneously due to what is believed to be gross microcracking in the microstructure.

Also reported in table II are the mean coefficient of thermal expansion (CTE) over the temperature range from room temperature to 1000° C. as measured using a dilatometer. For the inventive examples the CTE ranges between $-3.0 \times 10^{-7}$/° C. to $+12 \times 10^{-7}$/° C., considerably lower than $38 \times 10^{-7}$/° C. for the comparative example 1.

Figure 1:
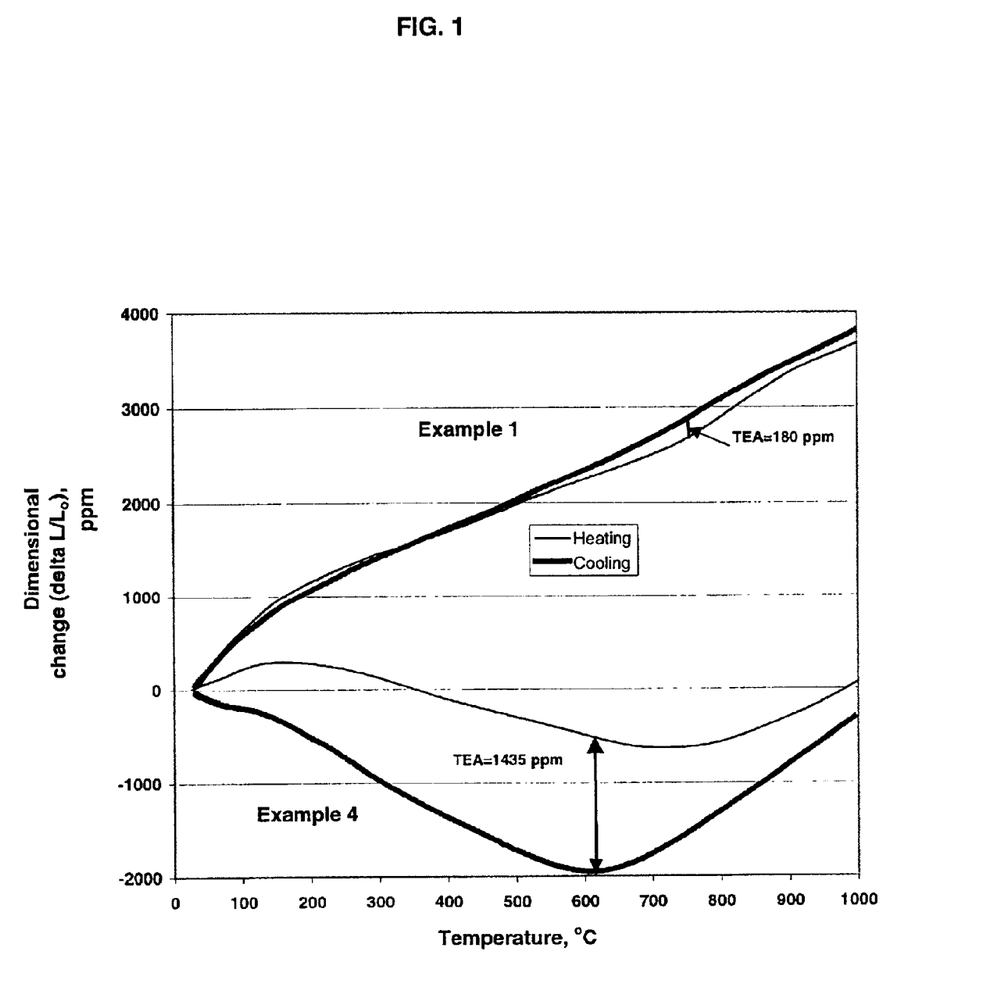
FIG. 1 illustrates a comparison between the thermal expansion of Example 1, a pure pollucite structure, and Example 4, the diphasic inventive structure.

Referring now to FIG. 1 therein illustrated is a comparison between the thermal expansion behavior of comparative example 1 (pure pollucite) and inventive example 4 (structure with phases $Cs_2O.Al_2O_3.4SiO_2$ ($CAS_4$), and $Cs_2O.Al_2O_3.2SiO_2$ ($CAS_2$)) as determined by dilatrometry. The dimensional change $\Delta L/L_0$ in parts per million (ppm) is plotted as a function of temperature from room temperature to 1000° C. for both heating and cooling cycles. In comparative example 1, the heating curve nearly overlaps the cooling curve, and there is negligible hysteresis detected. The maximum thermal expansion anisotropy is the largest difference between the heating and cooling curves at a given temperature in the range from room temperature to 1000° C. For inventive example 4, the thermal expansion anisotropy is calculated to be about 1435 ppm.

In inventive example 4 the behavior of the heating curve is much different than the behavior of the cooling curve; more specifically the thermal expansion of inventive example 4 is characterized by extreme hysteresis or high thermal expansion anisotropy. Extreme hysteresis or high thermal expansion anisotropy is indicative of differing microstructures present ceramic between heating and cooling, as a result of the generation of microcracks during cooling and their partial healing during heating. The presence of the microcracks creates a free internal volume manifested by a low or negative mean coefficient of thermal expansion, as can be observed for inventive example 4 in FIG. 2.

Therefore, an advantage of the inventive structures is a high thermal expansion anisotropy of between 1400–1450 ppm, as calculated from the dimensional change $\Delta L/L_0$ over a temperature range from room temperature to 1000° C.

Figure 2:
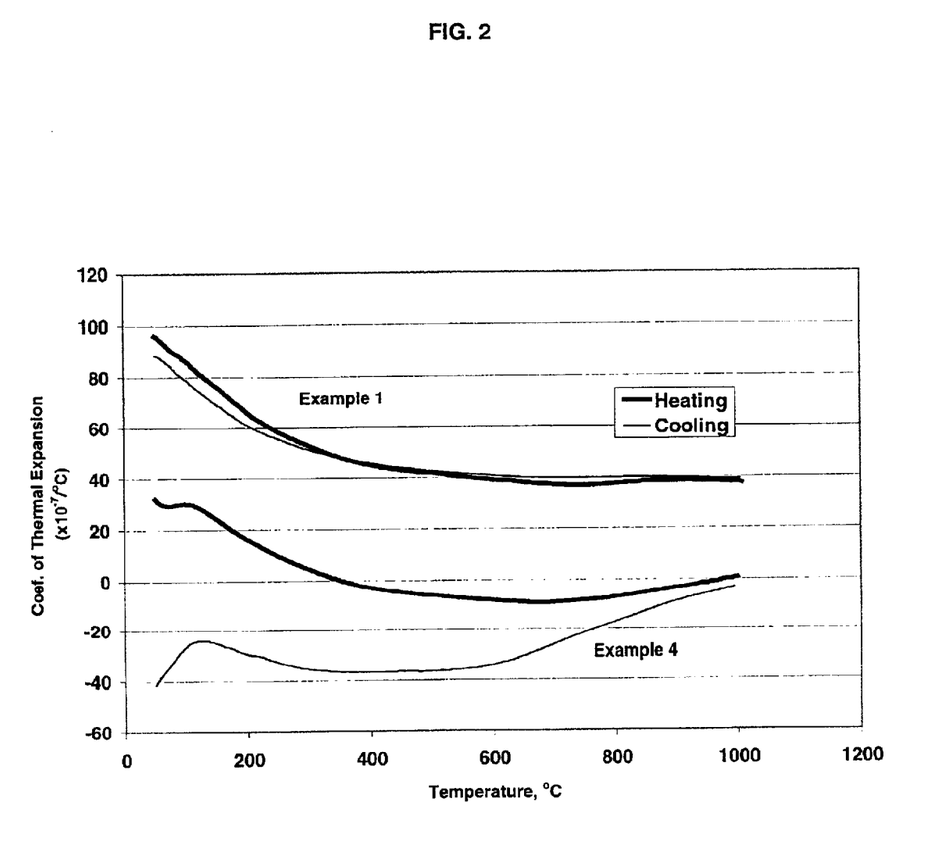
FIG. 2 illustrates a comparison between the coefficient of thermal expansion Example 1, a pure pollucite structure, and Example 4, a two phase structure.

In FIG. 2, the CTE of comparative example 1 reveals a high expansion of about $60\text{–}100\times10^{-7}/°$ C. over a temperature range from room temperature to about 200° C. The CTE does decrease to about $40\times10^{-7}/°$ C. at 1000° C., however it is still unacceptably high for diesel particulate filters.

Due to a high thermal expansion anisotropy, the CTE curve of the two phase material of inventive example 4 differs appreciably from the pure pollucite material of comparative example 1. The initial portion of the heating curve, from room temperature to about 200° C. reflects the dominance of the $CAS_4$ phase and the relatively low percentage of microcracks, with a value of CTE at about $20\times10^{-7}/°$ C.; however, the CTE is still considerably lower than that of comparative example 1 for the same temperature range. From about 350° C. to 1000° C., the CTE decreases with increasing temperature to between zero to $-10\times10^{-7}/°$ C., as a result of microcracking. During cooling, a negative CTE is maintained which results in excellent resistance to thermal shock for the inventive body.

Figure 3:
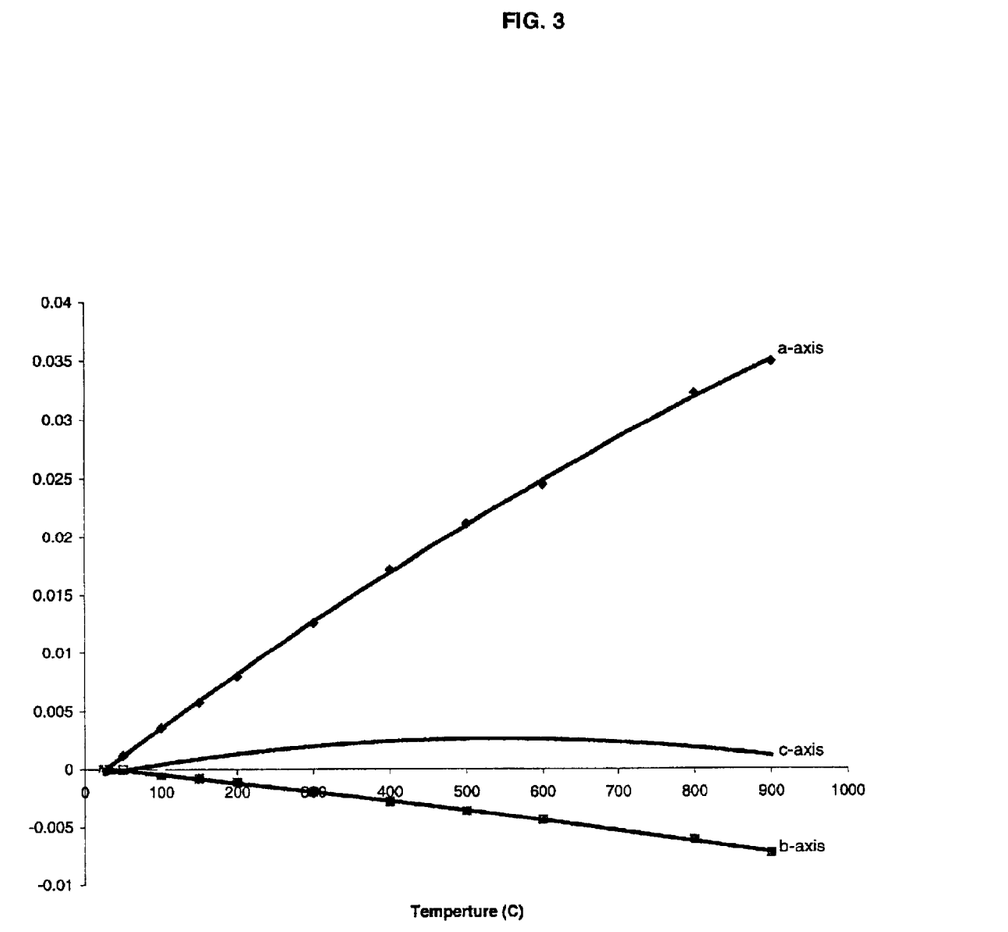
FIG. 3 illustrates the axial expansion curves for the $CAS_2$ phase as determined by high temperature x-ray diffraction.

Although not intended to be bound by theory it is believed that the hysteresis behavior is a result of microcracking with increasing temperature. In turn the microcracking is a function of extreme thermal expansion anisotropy (widely differing expansions among different crystallographic axes) within the $CAS_2$ lattice and the large CTE differences between the two phases. The $CAS_2$ phase is orthorhombic with widely differing expansions among its crystallographic axes, as shown in FIG. 3 which illustrates the axial thermal expansion data for the a-axis, b-axis, and c-axis as obtained by hot stage x-ray diffraction. Calculation of the CTE over a temperature range from room temperature to 800° C., for each axis of the $CAS_2$ phase reveals the following high degree of anisotropy: a-axis=$+500\times10^{-7}/°$ C.; b-axis=$-130\times10^{-7}/°$ C.; c-axis=$+30\times10^{-7}/°$ C. By contrast pollucite is a cubic crystal, and thus displays no thermal expansion anisotropy among the crystallographic axes.

Figure 4:
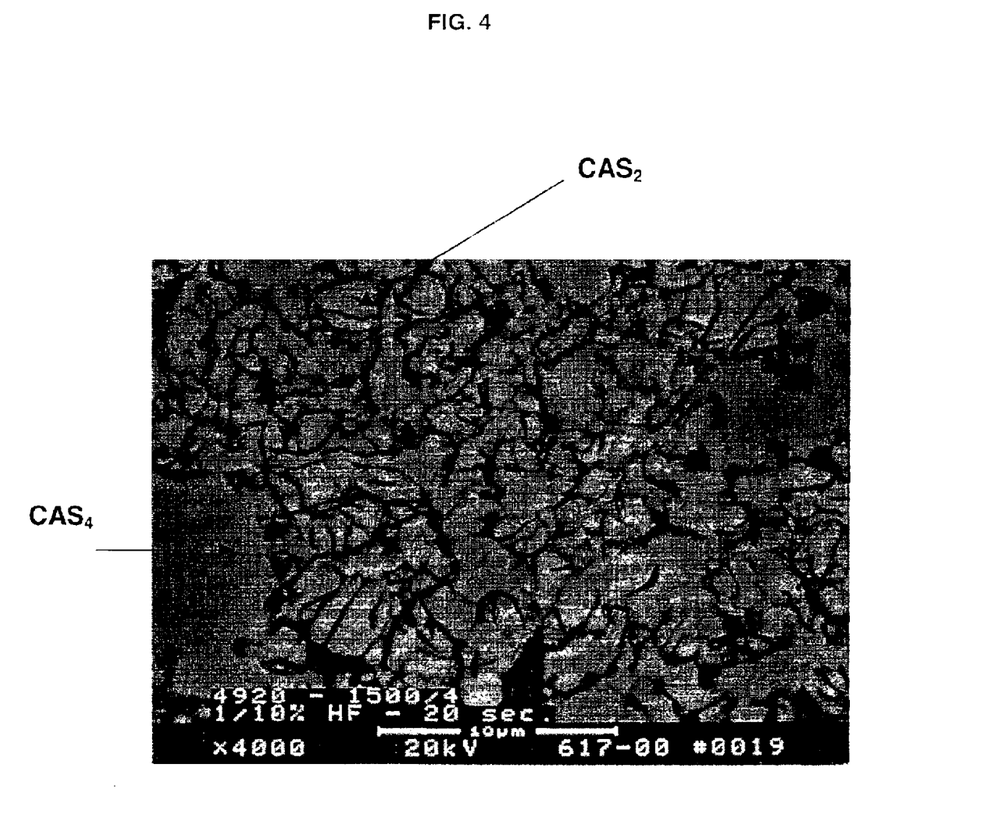
FIG. 4 shows a micrograph depicting the microstructure of the inventive material.

FIG. 4 is a Scanning Electron Microscope micrograph showing the microstructure of a two phase $CAS_2$–$CAS_4$ material of the instant invention at a magnification of 4000×. Two distinct phases can be observed: a highly microcracked matrix which is identified as the $CAS_2$-phase and large, isolated uncracked regions which is identified as the $CAS_4$-phase. The $CAS_2$-phase is small approximately 1–2 microns in size compared to the $CAS_4$-phase of about 10–20 microns. As can be observed the $CAS_4$-phase enclose and isolate the $CAS_2$-phase highly microcracked regions. It has been found that this microstructure enables the inventive structure to posses a combination of negative to near-zero CTE, extreme thermal expansion anisotropy and high refractoriness.

TABLE I

| Glass | NZC | NZO | OAM | OAT |
|---|---|---|---|---|
| Dry Blend Raw Materials | | | | |
| $Cs_2O$ | 67.7 | 62.3 | 60.0 | 43.3 |
| SrO | — | — | — | 15.9 |
| $Li_2O$ | — | — | 0.6 | — |
| $SiO_2$ | 28.9 | 32.9 | 34.5 | 36.9 |
| $Al_2O_3$ | 3.1 | 4.5 | 4.7 | 3.9 |
| $SiO_2/Cs_2O$ molar ratio | 2.0 | 2.5 | 2.7 | — |
| $SiO_2/(Cs_2O + SrO)$ molar ratio | — | — | — | 2.0 |
| Dry Blend Composition | | | | |
| Example 1 (comp.) | 70 wt. % NZC + 30 wt. % clay | | | |
| Example 2 (inv.) | | 85 wt. % NZO + 15 wt. % alumina | | |
| Example 3 (inv.) | | | 85 wt. % OAM + 15 wt. % alumina | |
| Example 4 (inv.) | | | 85 wt. % OAM + 15 wt. % alumina | |
| Example 5 (inv.) | | | 85 wt. % OAM + 15 wt. % alumina | |
| Example 6 (inv.) | | | | 80 wt. % OAT + 20 wt. % alumina |

TABLE II

| Example Number | 1 | 2 | 3 | 4 | 5 | 6 |
|---|---|---|---|---|---|---|
| Example Type | Comp. | Inv. | Inv. | Inv. | Inv. | Inv. |
| Mixture Components | | | | | | |
| Dry Blend | 63.5 | 58.0 | 62.2 | 63.5 | 63.5 | 64.3 |
| Liquid System | | | | | | |
| Polymer | | | | | | |
| Carbopol 2020 ® | 2.7 | 2.5 | 2.8 | 2.8 | 2.3 | — |
| Polyvox WSR ® | — | — | — | — | 0.46 | — |
| Methylcellulose (Methocel F40M ®) | — | — | — | — | — | 2.8 |

TABLE II-continued

| Example Number | 1 | 2 | 3 | 4 | 5 | 6 |
|---|---|---|---|---|---|---|
| Example Type | Comp. | Inv. | Inv. | Inv. | Inv. | Inv. |
| Solvent | | | | | | |
| Deionized Water | — | 8.7 | — | — | — | — |
| Emulsion D | 21.0 | 19.2 | 19.4 | 21.0 | 19.1 | 20.1 |
| Isopropanol | — | — | — | — | 1.91 | — |
| Pore Forming Agent | | | | | | |
| Graphite | 12.7 | 11.6 | 15.6 | 12.7 | 12.7 | 12.9 |
| Firing Conditions | | | | | | |
| Furnace Type | electric | electric | electric | electric | electric | electric |
| Maximum Temperature (° C.) | 1350 | 1550 | 1350 | 1350 | 1350 | 1400 |
| Hold Time (hours) | 4 | 12 | 4 | 4 | 4 | 6 |
| Phase Assemblage | | | | | | |
| $Cs_2O.Al_2O_3.4SiO_2$ ($CAS_4$) | x | x | x | x | x | x |
| $Cs_2O.Al_2O_3.2SiO_2$ ($CAS_2$) | — | x | x | x | x | x |
| $SrO.Al_2O_3.2SiO_2$ ($SAS_2$) | — | — | — | — | — | x |
| $CAS_4$—$CAS_2$ I-Ratio | 14.0 | 0.63 | 0.8 | 2.0 | — | — |
| Properties of Fired Ware | | | | | | |
| Mean CTE from 22 to 1000° C. ($10^{-7}$/° C.) | 38.0 | 12.0 | 1.0 | -3.0 | — | 4.7 |

What is claimed is:

1. A ceramic structure comprising a first phase $Cs_2O.Al_2O_3.4SiO_2$ ($CAS_4$), a second phase $Cs_2O.Al_2O_3.2SiO_2$ ($CAS_2$), and a third phase selected from the group consisting of $SrO.Al_2O_3.2SiO_2$ ($SAS_2$), $SrO.SiO_2$ ($SrSiO_3$) and combinations thereof, wherein the ceramic has a high thermal expansion anisotropy of between 1400–1450 ppm, as calculated from dimensional change $\Delta L/L_o$ over a temperature range from room temperature to 1000° C., and an average coefficient of thermal expansion from room temperature to 1000° C. of $-10 \times 10^{-7}$/° C. to $+25 \times 10^{-7}$/° C.

2. The ceramic structure of claim 1 wherein the average coefficient of thermal expansion from room temperature to 1000° C. is about $-5 \times 10^{-7}$/° C. to $+15 \times 10^{-7}$/° C.

3. A diesel particulate filter comprising a highly refractory ceramic having a first phase $Cs_2O.Al_2O_3.4SiO_2$ ($CAS_4$), a second phase $Cs_2O.Al_2O_3.2SiO_2$ ($CAS_2$), and a third phase third phase selected from the group consisting of $SrO.Al_2O_3.2SiO_2$ ($SAS_2$), $SrO.SiO_2$ ($SrSiO_3$) and combinations thereof, wherein the ceramic has a high thermal expansion anisotropy from room temperature to 1000° C. and an average coefficient of thermal expansion from room temperature to 1000° C. of $-10 \times 10^{-7}$/° C. to $+25 \times 10^{-7}$/° C., wherein the diesel particulate filter comprises a honeycomb body, the honeycomb having an inlet end and an outlet end and a multiplicity of cells extending from the inlet end to the outlet end, the cells having porous walls, wherein part of the total number of cells at the inlet end are plugged along a portion of their lengths, and the remaining part of cells that are open at the inlet end are plugged at the outlet end along a portion of their lengths, so that an engine exhaust stream passing through the cells of the honeycomb from the inlet end to the outlet end flows into the open cells, through the cell walls, and out of the structure through the open cells at the outlet end.

4. The diesel particulate filter of claim 3 wherein the average coefficient of thermal expansion from room temperature to 1000° C. of $-5 \times 10^{-7}$/° C. to $+15 \times 10^{-7}$/° C.

5. A method of producing a formable mixture, the method comprising combining a dry blend material consisting essentially of 70–90%, by weight, of a glass frit, consisting essentially, expressed in weight percent on an oxide basis, of 60–68% $Cs_2O$, wherein a portion of $Cs_2O$ is substituted with SrO, wherein up to 30% by weight SrO is substituted for $Cs_2O$, 29–35% $SiO_2$, and optionally 3–5% $Al_2O_3$, and 10–30%, by weight, $Al_2O_3$, a solvent selected from the group consisting of deionized water, an emulsion consisting essentially of, about 95%, by weight, deionized water, about 0.7%, by weight, triethanolamine and about 4.3%, by weight, oleic acid, and combinations thereof, and a polymer selected from the group consisting of a crosslinked polyacrylic acid copolymer, a polyethylene oxide polymer, and combinations thereof.

6. The method of claim 5 wherein the polymer is a crosslinked polyacrylic acid copolymer.

7. The method of claim 5 wherein the glass frit consists essentially, expressed in weight percent on an oxide basis, of 60–68% $Cs_2O$, 29–35% $SiO_2$, and optionally 3–5% $Al_2O_3$.

8. The method of claim 5 wherein up to 2%, by weight, $Li_2O$ is substituted for $Cs_2O$.

9. The method of claim 5 wherein up to 30%, by weight, SrO, is substituted for $Cs_2O$.

10. The method of claim 9 wherein the polymer is an aqueous-based cellulose ether polymer.

11. The method of claim 10 wherein the aqueous-based cellulose ether polymer is selected from the group consisting of methylcellulose or hydroxylpropyl methylcellulose.

12. The method of claim 11 wherein the solvent is an emulsion consisting essentially of, about 95%, by weight, deionized water, about 0.7%, by weight, triethanolamine and about 4.3% by weight, oleic acid, and the polymer is methylcellulose.

13. The method of claim 5 comprising the additional step of shaping the mixture by extrusion into a monolithic structure.

14. The method of claim 13 wherein the mixture is shaped by extrusion.

15. The method of claim 14 wherein the mixture is extruded into a honeycomb.

16. A method of making a monolithic structure for high temperature filtration applications, the method comprising:
   a) forming a mixture comprising:
      i) about 50–85%, by weight, dry blend consisting essentially of:

1) 70–90%, by weight, of a glass frit consisting essentially, expressed in weight percent on an oxide basis, of 60–68% $Cs_2O$ wherein a portion of $Cs_2O$ is substituted with SrO, wherein up to 30% by weight SrO is substituted for $Cs_2O$, 29–35% $SiO_2$, and optionally 3–5% $Al_2O_3$; and, 2) 10–30%, by weight, $Al_2O_3$; and, ii) 15–30%, by weight, of a solvent selected from the group consisting of deionized water, an emulsion consisting essentially of, about 95%, by weight, deionized water, about 0.7%, by weight, triethanolamine and about 4.3% by weight, oleic acid, and combinations thereof;

iii) 0.1–8%, by weight, of a polymer selected from the group consisting of a crosslinked polyacrylic acid copolymer, a polyethylene oxide polymer, and combinations thereof; and, iv) 0–25%, by weight, of a pore former;

b) shaping the mixture to form a green body; and, c) firing the green honeycomb structure in an electric furnace at a temperature of about 1350 to 1550° C. over a period of about 6 to 12 hours, and held at a maximum temperature for about 4 to 12 hours to form a fired structure comprising ceramic having a first phase $Cs_2O.Al_2O_3.4SiO_2$ ($CAS_4$), a second phase $Cs_2O.Al_2O_3.2SiO_2$ ($CAS_2$), and a third phase third phase selected from the group consisting of $SrO.Al_2O_3.2SiO_2$ ($SAS_2$), $SrO.SiO_2$ ($SrSiO_3$) and combinations thereof.

17. The method of claim 16 wherein dry blend consists essentially of about 85%, by weight, glass fit and about 15%, by weight, alumina.

18. The method of claim 16 wherein up to 2%, by weight, $Li_2O$ is substituted for $Cs_2O$.

19. The method of claim 18 wherein the polymer is added at 0.1–4%, by weight.

20. The method of claim 19 wherein the polymer is crosslinked polyacrylic acid copolymer.

21. The method of claim 16 wherein up to 30%, by weight, SrO, is substituted for $Cs_2O$.

22. The method of claim 16 wherein the aqueous-based cellulose ether polymer is selected from the group consisting of methylcellulose or hydroxylpropyl methylcellulose.

23. The method of claim 22 wherein the solvent is an emulsion consisting essentially of, about 95%, by weight, deionized water, about 0.7%, by weight, triethanolamine and about 4.3% by weight, oleic acid, and the polymer is methylcellulose.

24. The method of claim 16 wherein the pore former is graphite.

25. The method of claim 16 wherein the mixture is shaped by extrusion into a honeycomb structure having an inlet end and an outlet end and a multiplicity of cells extending from the inlet end to the outlet end, the cells having porous walls.

26. The method of claim 25 wherein every other cell is plugged to form a wall-flow filter.

* * * * *